United States Patent [19]

Brookfield

[11] Patent Number: 5,044,838
[45] Date of Patent: Sep. 3, 1991

[54] TOOL HOLDING CIRCULAR TOOTHED BLADES STATIONARY WHILE CUTTING OR GROOVING ROTATING WORK

[76] Inventor: Richard A. Brookfield, 9625 Merrimoor Blvd., Largo, Fla. 34647

[21] Appl. No.: 514,754

[22] Filed: Apr. 26, 1990

[51] Int. Cl.$^5$ .............................................. B23P 15/28
[52] U.S. Cl. .................................... 407/103; 407/104; 407/105
[58] Field of Search ................. 82/158, 159, 160, 161; 407/103, 104, 105, 64

[56] References Cited

U.S. PATENT DOCUMENTS

| | | | |
|---|---|---|---|
| 349,475 | 9/1886 | Barclay | 407/64 |
| 1,413,326 | 4/1922 | Dover | 407/64 |
| 3,182,534 | 5/1965 | Hoffmann | 407/64 |
| 3,288,005 | 11/1966 | Tringale et al. | 82/36 |
| 4,326,437 | 4/1982 | Fischer | 32/36 |

FOREIGN PATENT DOCUMENTS 0346157  7/1920  Fed. Rep. of Germany ........ 407/64

*Primary Examiner*—Frederick R. Schmidt
*Assistant Examiner*—Lawrence Cruz

[57] ABSTRACT

A tool for use with a tool holder has a body to which at least one blade such as a circular saw blade or milling cutter is clamped to prevent the blade from turning when a selected tooth is brought into cutting or grooving contact with a rotating work piece, the body of the tool has first and second parallel clamping surfaces through which a diametric slot opens. A first clamping member has a hub on which a blade is rotatably mounted and which fits the slot and is held thereby against turning. The two clamping members are connected by a threaded member by which the clamping members are drawn towards each other to clamp the blade against the first clamping surface. A member threaded radially through the body extends into the slot and is operable to move the hub radially with respect to the center thereof enabling positions of a tooth relative to the work piece to be precisely established. When more than one blade is mounted on the hub, the blades are held apart by a spacer.

11 Claims, 5 Drawing Sheets

U.S. Patent    Sep. 3, 1991    Sheet 1 of 5    5,044,838
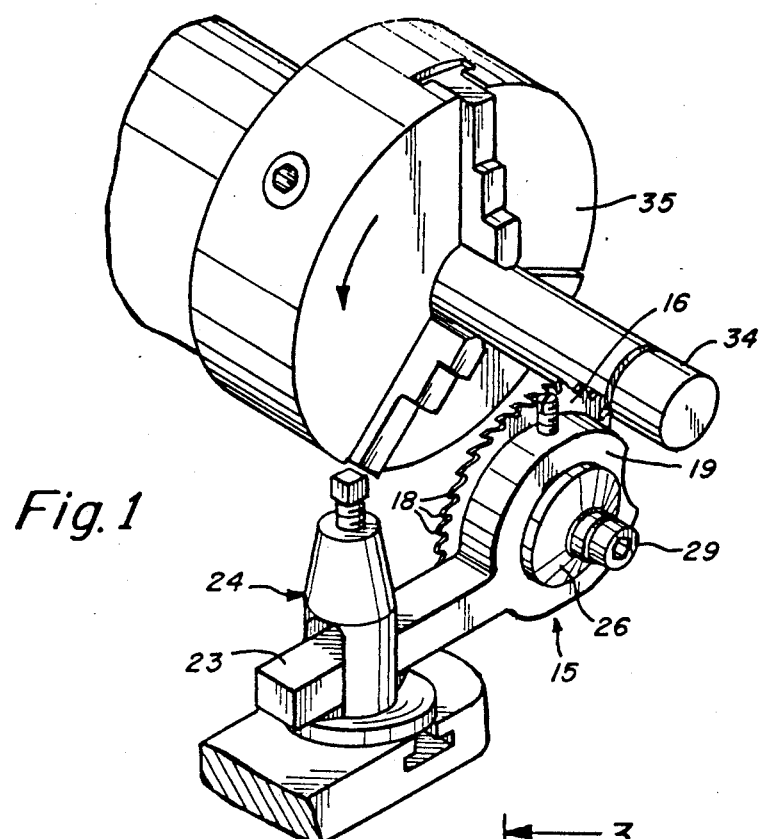
Fig. 1
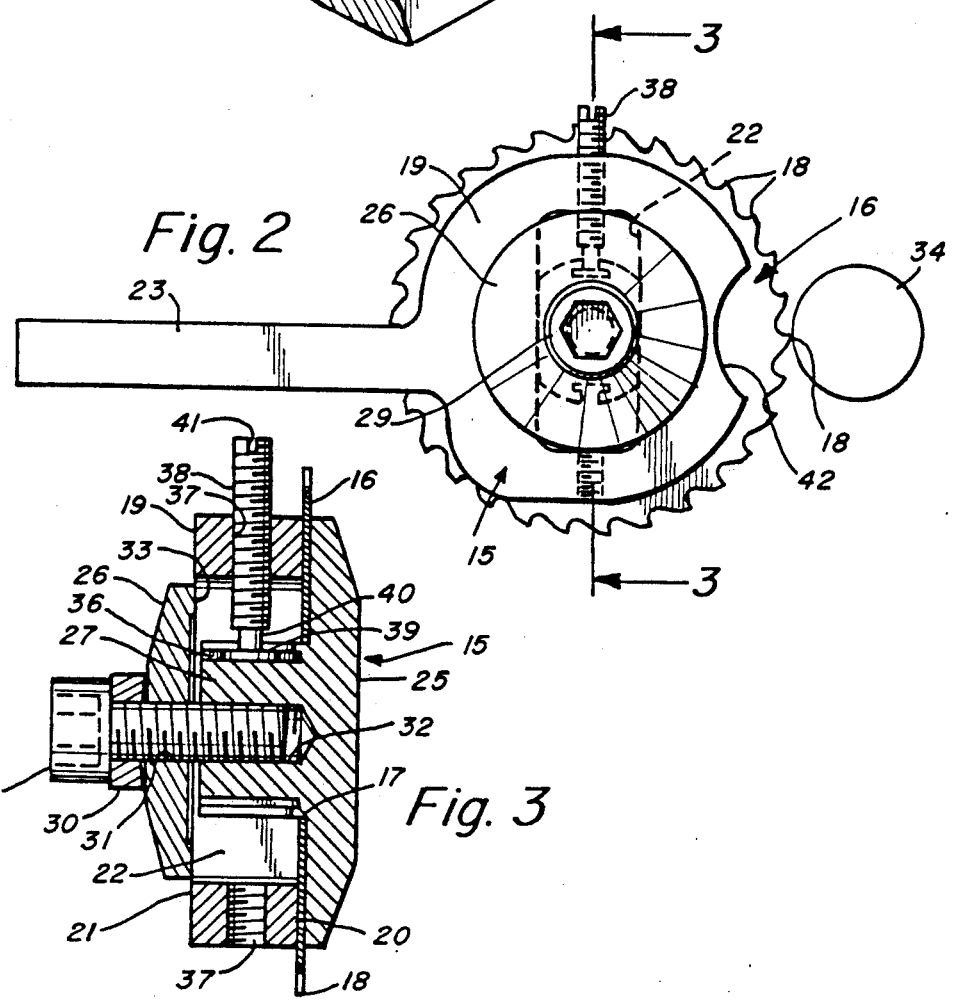
Fig. 2
Fig. 3

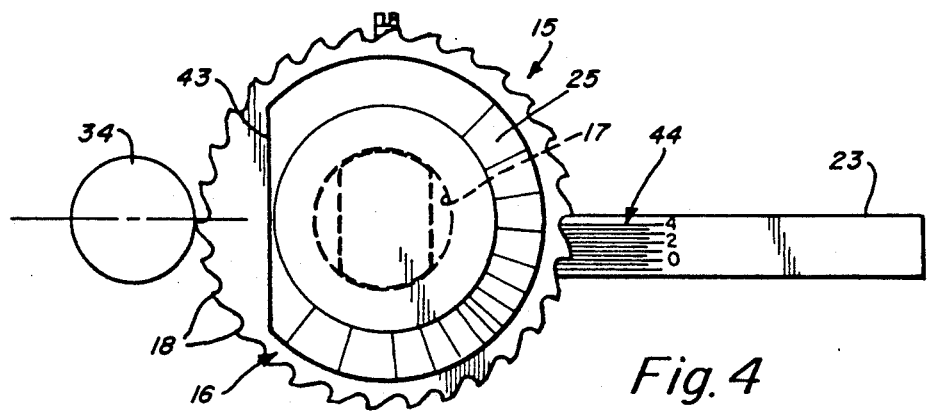
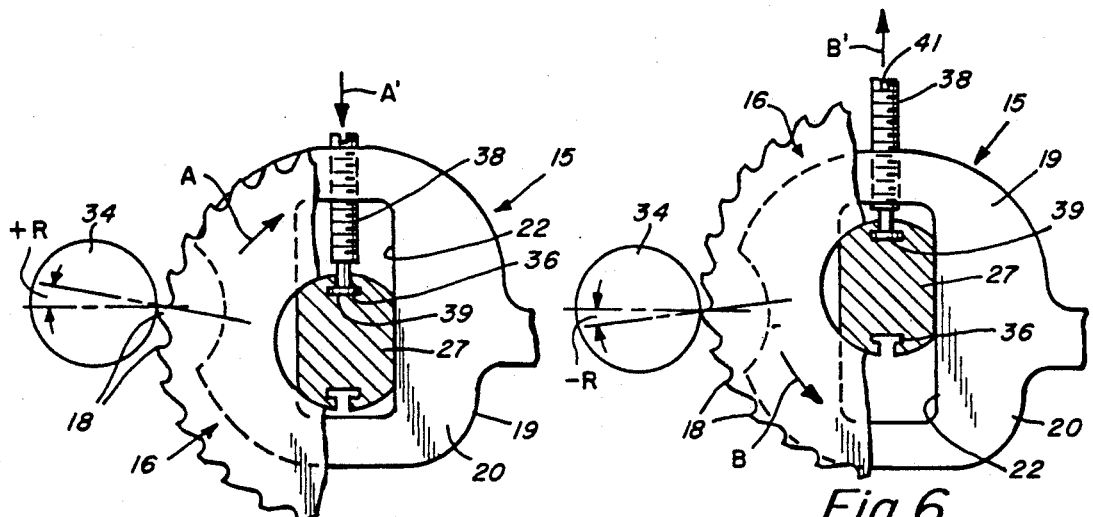
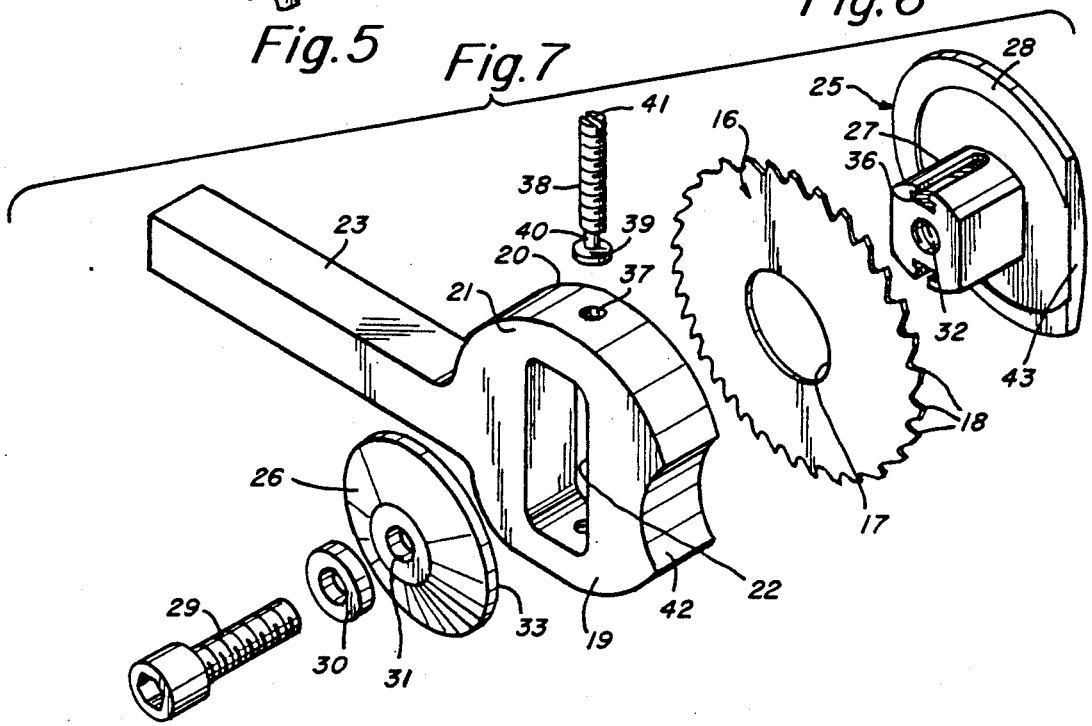

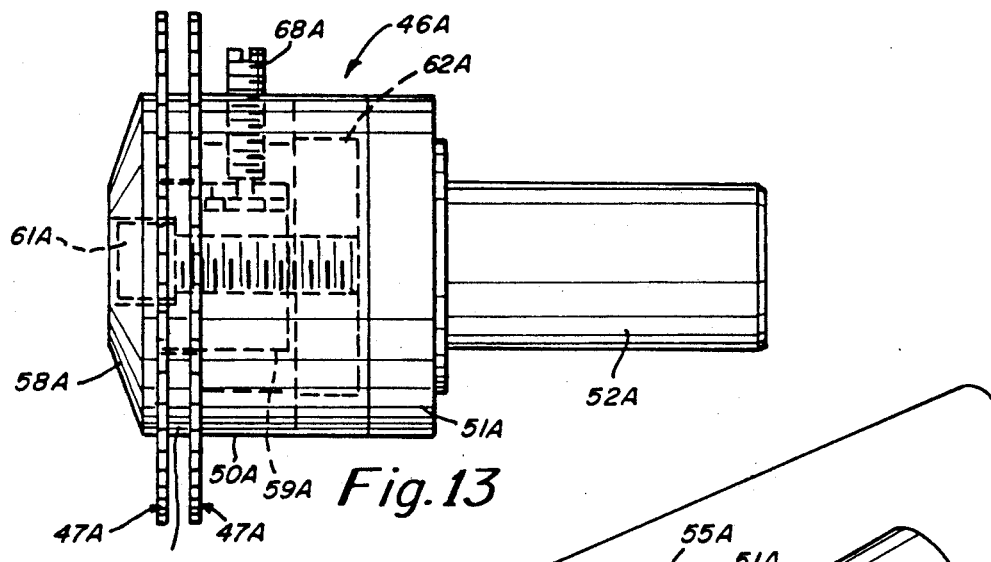
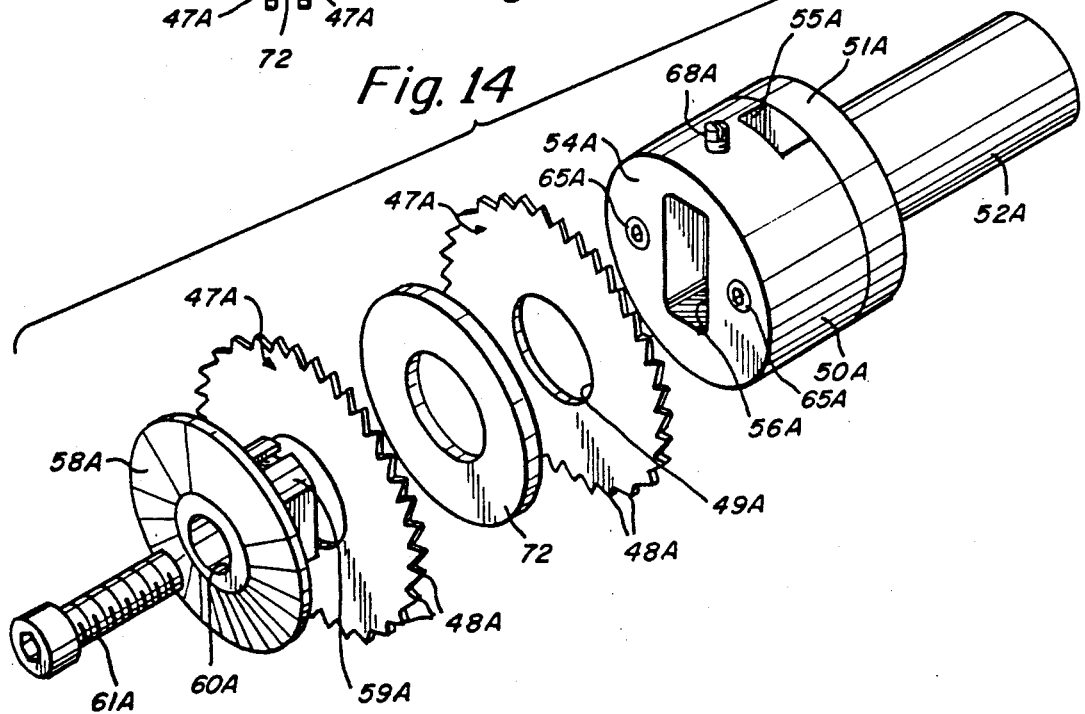

TOOL HOLDING CIRCULAR TOOTHED BLADES STATIONARY WHILE CUTTING OR GROOVING ROTATING WORK

BACKGROUND OF THE INVENTION

It has long been the practise to employ in machine tools of which lathes are but one example, rotatable members having a peripheral series of uniformly spaced elements each of which is to be brought into contact with a rotating work piece while the member is held against turning.

Each element of a member may be capable of performing a function differing from that performed by the other elements of that member or the elements may all be of the same type with each for use when the element in contact with the work piece is no longer fit for further service.

In either case, such members required indexing means and usually readjusting controls in order to effect the positioning of the selected element for proper engagement with the work piece.

THE PRESENT INVENTION

The general objective of the present invention is to provide a tool to be held in a machine tool with at least one circular blade, such as a circular saw blade or a milling cutter, clamped thereto against turning when a selected tooth is brought into cutting or grooving contact with a rotating work piece.

In accordance with the invention, this objective is attained with a tool having a body provided with a clamping surface in the center of which there is a socket. A clamping member has a hub which is shaped and dimensioned to extend through the central aperture of such a blade both to slidably support it and permit it to be turned and also to extend into the socket. The socket and blade are shaped and dimensioned so that, when the hub is entered in the socket, it is held against turning while the clamping member is being forced by a rotating connection with the tool into a position clamping the blade, supported by the hub, against the backing surface.

Circular saw blades are available in a substantial range of diameters and thicknesses. Their teeth are usually hollow ground providing a configuration suitable for grooving as well as cutting off lengths of rotating work pieces. When larger work is involved, milling cutters are used and these have their teeth wider than the body of the blade but relieved in all directions from their cutting edges.

One of the features of the invention is that substantial areas of the blades are rigidly supported when clamped against the backing surface of the tool and since blade diameters vary, clamping members of diameters appropriate for the different blade sizes are used. As each clamping member approaches the diameter of the blade, it is cut away adjacent the position of a tooth to be used in order to accommodate the work piece being severed. While conventional blades are well adapted for use, if chip clearance is a problem, blades with increased spacing between their teeth overcome that difficulty.

An important feature of a tool body having a socket in a backing surface to receive and hold the blade supporting hub against turning, is that with a socket of appropriate depth and a hub of corresponding axial extent, more than one blade can be mounted thereon. When more than one blade is to be used at the same time, spacers separate them. A set of line spacers, differing from each other in thickness enable short and even thin sections to be accurately cut.

Another objective of the invention is to make possible the precise positioning of the selected tooth or teeth when the tool is secured to a tool holder. Before the blade or blades are so clamped against the backing surface as to prevent their turning, the blade or blades are manually turned to bring them as close as possible to their correct position. To ensure precise positioning, the socket in the backing surface is a diametrically extending slot in which the hub is a slideable fit and moveable in either radial direction, moving the clamping member and any blade mounted on the hub with it. With adjusting means threaded radially through the body of the tool into releasable engagement with the hub, the hub can readily be moved to effect the precision positioning of the selected tooth or teeth by turning the adjusting member in one direction or the other.

A further objective of the invention is to provide hub adjusting means requiring but a single threaded adjusting member. For that purpose, the hub of the clamping member has an undercut, lengthwise slot, preferably T-shaped in cross section with the narrow part of the slot opening towards the threaded member. The end of the threaded member is formed with a head dimensioned to be a sliding fit in the wider part of the undercut slot and a neck or narrower portion of a diameter such that it is a sliding fit in the narrower part of the slot. The hub thus can be detachably connected to the threaded adjusting member when the hub is entrant of the diametrically disposed slot and the head of the threaded member is in alignment with the wider part of the undercut slot. In practise, the diametrically disposed slot is of sufficient length to enable positive and negative rake positions also to be precisely established by the same means.

Yet another objective of the invention is to enable the detachable connection between the hub and the adjusting member to be easily made as each time a blade is changed, that connection is released as the clamping member is detached from the body. To that end, the tool body has a second parallel backing surface through which the diametrical slot opens a second clamping member is provided to overlie the second backing surface and the two clamping members are detachably interconnected by a threaded member extending axially through one clamping member, the slot and threaded into the other clamping member and operable to effect the clamping of the blade or blades between the first clamping member and the first backing surface. Before the slot extending through the body is closed by the second clamping member, both the hub and the adjusting means are visible enabling their interconnection to be easily made.

Other objectives, novel features and advantages will be apparent from the accompanying drawings, the detailed description thereof and the appended claims.

BRIEF DESCRIPTION OF THE DRAWINGS

The accompanying drawings illustrate preferred embodiments of the invention of which FIG. 1 is a perspective view of the first preferred embodiment of a tool in accordance with the invention and illustrates its use with a circular saw blade in cutting or grooving rotating work;

FIG. 2 is a side view of the tool on an increase in scale, the side being that which is exposed in FIG. 1;

FIG. 3 is a section taken approximately along the indicated line 3—3 of FIG. 2;

FIG. 4 is a view of the opposite side of the tool;

FIG. 5 is a like view of the tool with the position of the blade adjusted to effect positive rake;

FIG. 6 is another like view with the blade adjusted where negative rake is wanted;

FIG. 7 is an exploded view of the tool;

FIG. 8 is a side view of a tool in accordance with the second embodiment of the invention;

FIG. 9 is a front end view thereof;

FIG. 10 is an exploded view of the tool illustrated by FIGS. 8 and 9;

FIG. 13 is a side view of a tool similar to that illustrated by FIG. 10 also for use in holding more than one blade; and FIG. 14 is an exploded view of the tool illustrated by FIG. 13.

THE PREFERRED EMBODIMENT

Figure 11:
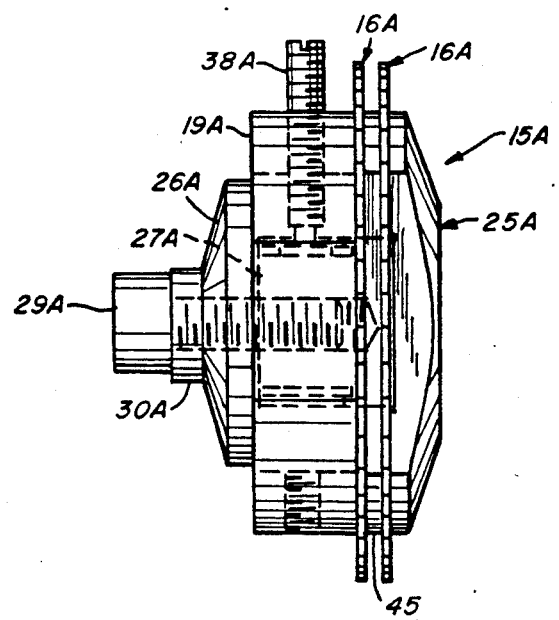
FIG. 11 is a side view of a tool similar to that illustrated by FIGS. 1-7 for use in holding more than one blade.

The cutting and grooving tool illustrated by FIGS. 1-7 is generally indicated at 15 and is for use with a toothed circular saw blade, generally indicated at 16 and of any commercially available or special type, having an axial aperture 17 and a circumferential series of teeth 18.

The tool 15 has a body 19 with first and second parallel backing surfaces indicated at 20 and 21, respectively and a straight slot 22 opening through both backing surfaces. The body 19 is also provided with a shank 23 extending laterally centrally of the body. The shank 23 is shown as rectangular in cross section and held by a tool holder generally indicated at 24 in FIG. 1. The width of the shank 23 is shown as equal to the thickness of the body 19.

The tool 15 is provided with first and second clamping members 25 and 26, respectively. The first clamping member 25 has a central hub 27 protruding from its clamping face 28 and is shaped and dimensioned both to extend through and to so fit the aperture 17 as to rotatably support the blade 16 and to extend into and be a sliding fit in the slot 22. The first clamping member 25 is thus held against turning but is enabled to be shifted in either radial direction to the extent permitted by the slot.

A threaded connector 29 extends through a washer 30, a central bore 31 in the second clamping member 26 and is threaded into a bore 32 centrally of the hub 27. With a blade 16 on the hub 27, the turning of the connector 29 in one direction draws the clamping members 25 and 26 towards each other until the clamping face 33 of the second clamping member 26 is clamped against the second backing surface 21 and the blade 16 is clamped tightly against the first backing surface 20 the slot then intersecting the axis of the blade. By turning the connector 29 in the opposite direction, the clamping pressure can be eased to an extent permitting the blade 16 to be turned or further turned to permit the tool to be disassembled and the blade 16 to be removed and replaced.

In FIG. 1, the assembled tool 15, held by the tool holder 24 has a selected tooth 18 in cutting or grooving contact with a rotating cylindrical work piece 34 held in a lathe chuck 35 and it is assumed to be precisely positioned.

While the clamping pressure on the blade 16 can be such that the blade can be manually turned to bring the blade into a correct position before the work piece 34 is rotated, correct positioning is not easily effected in that manner and such manually established positions are to be considered only approximate.

To enable such an approximate position to be made a precise one, the hub 27 is provided with a lengthwise slot 36 open at its free end and T-shaped in cross section with its narrow opening disposed towards one end of the slot 22. In practise, the hub 27 also has a like slot 36 opening towards the other end of the slot 22 and the body 19 has a threaded bore 37 opening into each end of the slot 22 through either one of which an adjusting member 38 is threaded. To enable the adjusting member 38 to be detachably connected to the hub 27, the inner end of the adjusting member has a head 39 shaped and dimensioned to be a sliding fit in the bottom of the appropriate slot and an annular neck 40 dimensioned to be a sliding fit in the narrower part of that slot. Such a connection is easily established when the hub 27, with a blade 16 supported thereby, is entered in the slot 22 and before the other end of the slot 22 is closed by the second clamping member 26 as the position of the head 39 of the adjusting member 38 can then be easily adjusted to enable the hub 27 to be fully seated and the connection established.

The other end of the adjusting member 38 has a kerf 41 enabling the blade 16, supported by the hub 27, to be precisely adjusted with a screwdriver to position the cutting edge of the selected tooth 18 in a no rake position, see FIG. 4. The slot 22 extends radially with respect to the blade axis to an extent such that positive rake positions, see FIG. 5, as well as negative rake positions, see FIG. 6, can both be accurately established. In FIG. 5, the blade has been turned relative to its FIG. 4 position, in the direction of arrow A as the member 38 was advanced in the direction A' to establish the rake angle +R. In FIG. 6, the blade has been turned in the direction B as the member 38 was withdrawn in the direction B' to establish the rake angle −R.

It will be noted from the drawings that the dimensions of the clamping face of the first backing surface 20 and the size and shape of the first clamping member 25 are such as to rigidly support the blade 16 close to the teeth except where the body 19 is recessed as at 42 to accommodate the work piece 34 as it is also being cut. As the position of the clamping member 25 is shifted during adjustments of the position of the selected tooth 18, a segment of it is cut away leaving a straight edge 43 to ensure accommodation of the work piece as it is being cut. It is preferred that, as blade sizes increase, first clamping members of correspondingly increased dimensions be employed to ensure that the blades are as rigidly supported as possible.

With the blade 16 adjusted into its wanted position, a grooving or cutting operation is continued until the tooth 18 in service is no longer sufficiently sharp for further use. The clamping pressure on the blade is then reduced to enable it to be manually turned to bring an adjacent tooth into an approximate position of use.

For the purpose of enabling the correct position to be established of the tooth next to be used, that face of the shank 23 which is partially covered by a clamped blade 16 is shown, see FIG. 4, as provided with a series of parallel lines 44. Before making a tooth change, the operator will have observed the nearest reference line to which the cutting edge of a tooth 18 overlying the series of lines 44 is positioned. After the approximate position of the next to be used tooth 18 has been established, its correct position is assured if or when the relationship of the cutting edge of a tooth 18 now overlying the series of reference lines 44 duplicates the previously observed relationship. The blade 16 is then tightly clamped against the backing surface 20.

Figure 12:
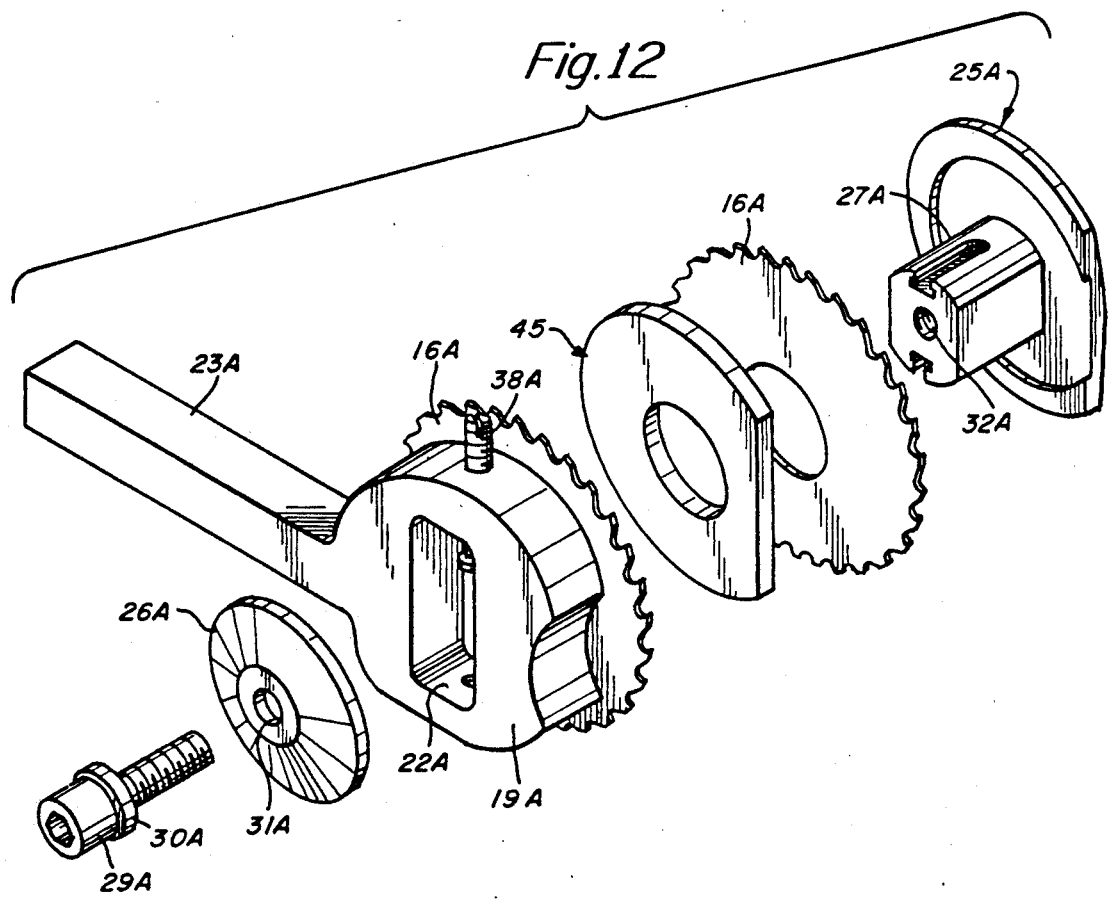
FIG. 12 is an exploded view of the tool illustrated by FIG. 11.

One of the features of the invention is that two blades 16 with a spacer 45 between them may be used to enable two short sections to be cut at the same time from the rotating work piece. While two blades and a spacer may be used with the tool illustrated by FIGS. 1–7, reference is made to FIGS. 11 and 12 illustrating a tool 15A adapted to accommodate a wider range of blade and spacer thicknesses.

As the tool 15A is substantially like the tool 15, it is not detailed and like reference numerals, distinguished by the suffix addition A, designate corresponding parts. In this embodiment, the axial extent of the hub 27 is increased as is the thickness of the body 19A. The two blades 16A are spaced apart by a spacer 45 selected from a series of spacers of differing thicknesses. It will be noted that the spacer 45 is otherwise of the size and shape of the first clamping member 25.

Figures 8, 9, 10:
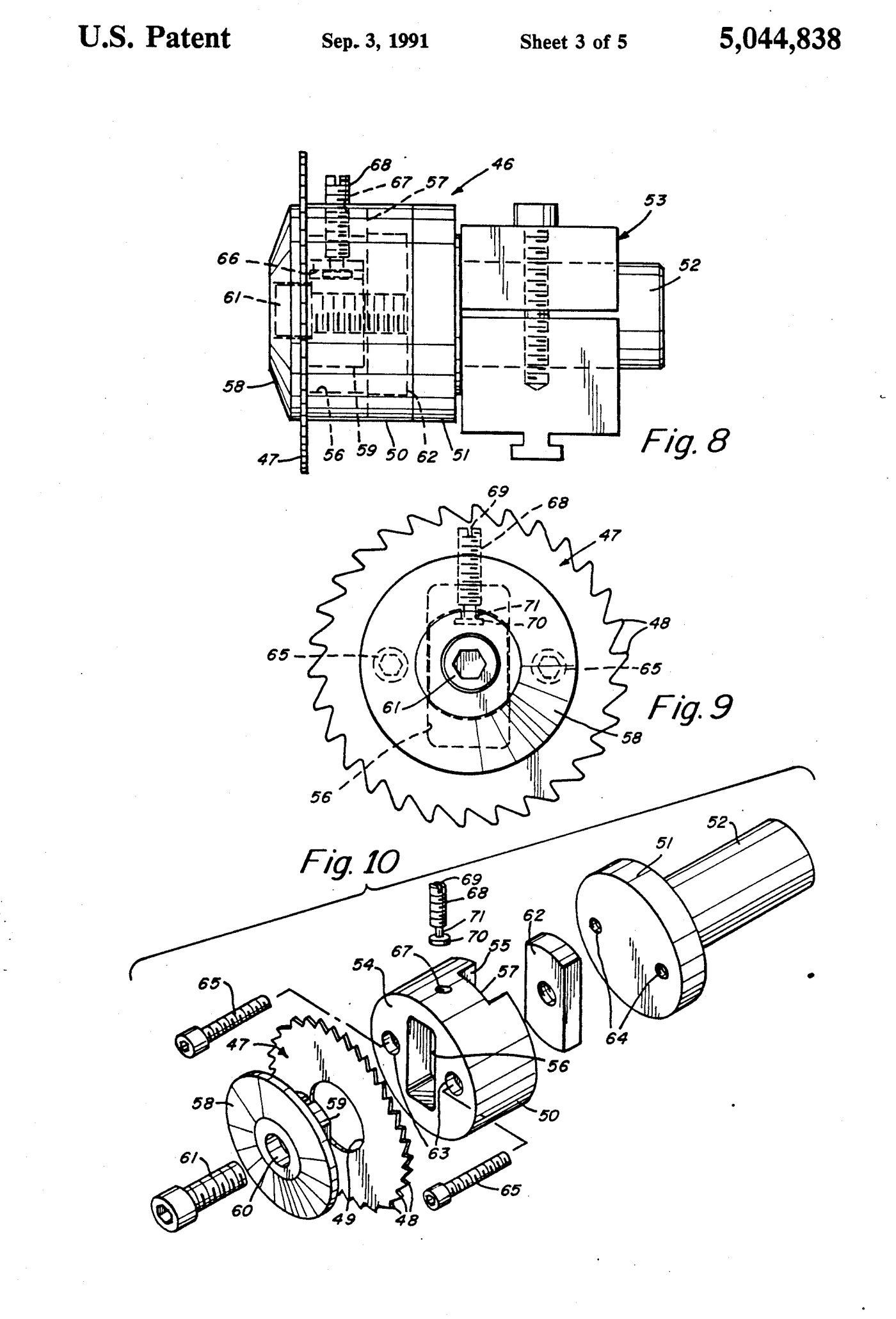

The embodiment of the invention illustrated by FIGS. 8–10 is generally similar in construction and use and is generally indicated at 46 and is shown with a circular saw blade 47 held thereby. The saw blade 47, like the blade 16 has a circumferential series of teeth 48 and a central aperture 49.

The body of the tool consists of a first or forward section 50 and a second or rearward section 51, both shown as cylindrical. The second section 51 has an axial shank 52 which is desirably of a relatively large diameter and is shown in FIG. 8 as clamped in place by a split clamping block 53.

The first body section 50 has a first backing surface 54 against which the blade 47 is clamped. The flat rear face of the first body section 50 has a straight channel 55 both ends of which intersect its periphery. A diametrically extending slot 56 in alignment with the channel but narrower than the channel 55 opens through the backing surface 54 and into the channel 55 with margins of the latter serving as the second backing surface 57.

The first clamping member 58 is shown as of the same shape as the first section 50 and has a hub 59 shaped and dimensioned to so fit the slot 56 as to extend through the blade aperture 49 and rotably support the blade 47, and be held thereby against turning with the slot intersecting the blade axis and also to enable the hub to be slid lengthwise thereof in either radial direction. A countersunk bore 60 axially of the clamping member 58 and the hub permits a cap screw 61 to extend therethrough and be threaded into a second clamping member 62 which is a sliding fit in the channel 55. By turning the cap screw 61 in one direction, the clamping members are drawn towards each other with the clamping member 62 seated against the backing surface 57 and the blade 47 locked against the backing surface 54 by the first clamping member 58. By turning the cap screw 61 in the opposite direction, the clamping pressure may be so eased as to permit the blade 47 to be turned manually or further turned to enable the clamping member to be detached and the blade 47 removed and replaced.

Counterbored holes 63 on opposite sides of the slot 56 and channel 55 extend through the first body section 50 and the second body section 51 has alignable threaded bores 64 to enable the two body sections to be detachably connected by cap screws 65.

After a blade 47 has been manually turned to bring a selected tooth 48 approximately into its correct position, its precise position is established in the manner detailed in connection with the embodiment illustrated by FIGS. 1–7. The hub 59, accordingly, has an undercut slot 66, shown as T-shaped in cross section, open at its free end and with the narrow part of the undercut slot open towards the end of the slot 56 in the body section 50. A threaded bore 67 in alignment with the slot 56 opens into that end of the slot 56 and an adjusting member 68 is threaded therethrough. The outer end of the adjusting member 68 has a kerf 69 and its inner end has a head 70 shaped and dimensioned to be a sliding fit in the undercut slot 66 and a neck 71 shaped and dimensioned to be a sliding fit in the narrower part thereof thus enabling the hub and adjusting member to be interconnected when the head 69 and the wider part of the slot 66 are aligned.

Whenever a blade 47 is to be replaced, the first clamping member is detached from the first body section 50 and the body section 50 is also detached from the body section 51. With the old blade 47 removed and replaced by a new one supported on the hub 59 of the first clamping member 58, the first clamping member is positioned with its hub entrant of the slot 56. Before the other end of the slot 56 is closed by the second clamping member 62, the hub and the adjusting member 68 are interconnected. The second clamping member 62 is then manually held in the channel 55 until the cap screw 61 is threaded through it. The first and second body sections are then reunited.

While the tool 46 can be used with two blades and a spacer, the tool 46A illustrated by FIGS. 13 and 14 is better adapted for use with a wide range of blade sizes and thicknesses of spacers such as the spacer 72 dimensioned to be slidably supported by the hub 59 and desireably of the size to provide adequate support for the blades.

The axial extent of the hub 59A of the tool 46A is increased for the accommodation of the blades 47A and spacers and accordingly the length of the first body section 50A is increased as is the depth of the channel 55A and the thickness of the second clamping member 62A.

As all other parts of the tool 46A are or may be the same as corresponding parts of the tool 46, such parts of the tool 46A are identified by the same reference numerals distinguished therefrom by the suffix addition "A".

From the foregoing, not only will the structural requirements of tools in accordance with the invention be apparent but also the manner of their uses will be evident.

I claim:

1. A tool for use with a holder in holding at least one blade such as a circular saw blade or a milling cutter against turning when a selected tooth of the blade is in cutting or grooving contact with a rotating work piece having a longitudinal center line, the blade having an axial aperture, said tool including a body provided with a shank connectable to the holder, said body having first and second parallel backing surfaces and a socket in the form of a straight slot having parallel sides and opening through both surfaces and normal to the center line of the work when the body is connected to the holder, first and second clamping members, the first clamping member provided with a hub shaped and dimensioned to extend through the blade aperture and rotatably and slidably support the blade and also to extend into the slot with the slot then intersecting the blade axis, the hub having flat sides spaced apart for sliding engagement with the sides of the slot thereby to prevent the hub from turning, the first clamping member and the portion of the body having the first backing surface so dimensioned that the portion of the periphery of the blade including the selected tooth protrudes therefrom, means detachably interconnecting the body and clamping members through the slot in a manner enabling the first clamping member with the blade supported by the hub to releaseably clamp the blade against the first backing surface, the second clamping member then engageable with the second backing surface, and the body provided with hub positioning means extending into the slot and detachably connected to the hub when in the slot and operable to shift the hub lengthwise of the slot to enable the selected tooth to be precisely positioned relative to the center line of the work after the blade has been manually turned to place the selected tooth in approximately its position for use and before the blade is clamped in place.

2. The tool of claim 1 in which there are two like blades and the tool includes at least one spacer having an axial aperture dimensioned to enable the spacer to be a slidable fit on the hub, the axial extent of the hub such that the two blades with the spacer between them can be supported by the hub with the hub extending into the socket.

3. The tool of claim 1 in which at least one tooth overlies a side of the shank as the blade is turned, said side having a series of spaced, transverse reference marks close to the path of a tooth crossing that side, the reference mark nearest the cutting edge of a tooth substantially opposite that of the selected tooth indicating the position of the cutting edge of another tooth when the blade has been turned to bring yet another tooth in a position of use replacing the selected blade.

4. The tool of claim 1 in which the length of the slot is such that the hub is slidable lengthwise thereof, in either radial direction, the body has a radial, threaded bore opening into an end of the slot, an adjusting member is threaded through the bore with one end exposed to enable it to be turned in one direction or the other, and a detachable connection between the other end of the threaded member and the hub enabling the rotatable member to be turned independently thereof and during such turning sliding said hub lengthwise of the slot in one direction or the other thereby to shift the first clamping member and accordingly the blade relative to the center of the slot to enable the selected tooth to be precisely positioned relative to the axis of the work piece after the blade has been manually turned to establish the approximate position of the tooth, the connection comprising complemental, interengageable portions positionable for engagement prior to the closing of the diametrically disposed slot by the second clamping member.

5. The tool of claim 4 in which the detachable connection between the hub and the member threaded through the radial bore comprises an open undercut slot extending lengthwise of the hub and the end of the adjusting member exposed within the slot has a head and an adjacent annular neck of reduced diameter enabling the connection to be established before the blade is to be clamped in place and the second clamping member is positioned to close the slot, when the undercut slot and the head and neck are aligned therewith and the hub then advanced in the slot to complete the connection.

6. The tool of claim 5 in which there are two like blades and the tool includes a spacer having an annular aperture dimensioned to enable the spacer to be slidably fitted on the hub, the axial extent of the hub such that the two blades with the spacer between them can be supported by the hub with the hub extending into the socket with the undercut slot positioned to receive the head of the adjusting member.

7. The tool of claim 1 in which the body includes first and second sections each of which has first and second ends, the first section having at the first end the first backing surface engageable by the blade and in the second end a diametrically disposed channel in the central portion of which the proximate end of the hub receiving slot opens and which is so dimensioned that marginal portions of the channel constitute second backing surfaces, the second clamping member fits freely in the channel against the second backing surfaces, the threaded member extends through the first clamping member and is threaded into the second clamping member, the second section includes at its second end the shank, and threaded members on opposite sides of the slot interconnect the second end of the first section, and the first end of the second section.

8. The tool of claim 7 in which the shank is cylindrical and axial with respect to the body.

9. The tool of claim 1 in which the body has a threaded bore opening into one end of the slot and an adjusting member is threaded through the bore into one end of the slot, a detachable connection in between that end of the adjusting member and the hub enabling the adjusting member to be turned in either direction independently of the hub and during such turning sliding the hub lengthwise of the hub in one direction or the other to enable the selected tooth to be precisely positioned relative to the work piece before the blade is clamped against the first backing surface.

10. The tool of claim 9 in which the length of the slot is such that the hub can be shifted by the threaded adjusting member to establish positive or negative rake positions.

11. The tool of claim 9 in which the second clamping member conceals the detachable connection when the two clamping members are interconnected and the detachable connection includes complemental interengageable portions positionable for such engagement prior to the interconnection of the clamping members.

* * * * *